(12) United States Patent
Jenny et al.

(10) Patent No.: US 10,442,391 B2
(45) Date of Patent: Oct. 15, 2019

(54) MOTOR VEHICLE COMPRISING PEDESTRIAN AIRBAG

(71) Applicant: GM GLOBAL TECHNOLOGY OPERATIONS LLC, Detroit, MI (US)

(72) Inventors: Thomas Jenny, Ruesselsheim (DE); Martin Stein, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/480,030

(22) Filed: Apr. 5, 2017

(65) Prior Publication Data

US 2017/0282848 A1 Oct. 5, 2017

(30) Foreign Application Priority Data

Apr. 5, 2016 (DE) .................. 10 2016 004 110

(51) Int. Cl.
*B60R 21/36* (2011.01)
*B60R 21/38* (2011.01)
B60R 21/00 (2006.01)

(52) U.S. Cl.
CPC .............. *B60R 21/36* (2013.01); *B60R 21/38* (2013.01); *B60R 2021/003* (2013.01); *B60R 2021/0004* (2013.01)

(58) Field of Classification Search
CPC ................................. B60R 21/36; B60R 21/38
See application file for complete search history.

(56) References Cited

U.S. PATENT DOCUMENTS

| 4,721,032 A | * | 1/1988 | Sakamoto | B60H 1/0055 454/146 |
| 6,182,782 B1 | * | 2/2001 | Matsuura | B60R 21/36 180/274 |
| 6,474,679 B2 | * | 11/2002 | Miyasaka | B60R 21/36 180/274 |
| 6,682,131 B2 | * | 1/2004 | Hayashi | B62D 25/081 296/192 |
| 6,880,666 B2 | * | 4/2005 | Kikuchi | B60R 21/2338 180/274 |
| 6,923,286 B2 | * | 8/2005 | Sato | B60R 21/36 180/274 |

(Continued)

FOREIGN PATENT DOCUMENTS

| DE | 10014832 A1 | 10/2001 |
| DE | 10102597 A1 | 9/2002 |

(Continued)

OTHER PUBLICATIONS

German Patent Office, German Search Report for German Application No. 102016004110.2, dated Dec. 23, 2016.

*Primary Examiner* — Nicole T Verley
(74) *Attorney, Agent, or Firm* — Lorenz & Kopf, LLP (57) ABSTRACT

A motor vehicle includes a vehicle body, a drive motor, and a water tank delimited by walls. At least one airbag module includes a gas generator and an airbag configured to deploy in the area of an exterior of the motor vehicle for the protection of pedestrians or the like. The airbag module is fastened above the wall of the water tank. A device for lifting a front hood from a closed initial position into an accident position, which is partially open in the area of the front windscreen.

15 Claims, 4 Drawing Sheets

(56) References Cited

U.S. PATENT DOCUMENTS

| | | | |
|---|---|---|---|
| 7,341,274 B2 * | 3/2008 | Mori | B60R 21/36 |
| | | | 180/274 |
| 7,357,212 B2 | 4/2008 | Sasaki et al. | |
| 7,527,121 B2 * | 5/2009 | Kitte | B60R 21/36 |
| | | | 180/274 |
| 7,537,272 B2 * | 5/2009 | Hirata | B60R 21/38 |
| | | | 296/187.04 |
| 7,584,988 B2 * | 9/2009 | Okamoto | B60R 21/36 |
| | | | 180/274 |
| 7,669,884 B2 * | 3/2010 | Kikuchi | B60R 21/215 |
| | | | 180/271 |
| 7,712,767 B2 * | 5/2010 | Takahashi | B60R 21/36 |
| | | | 180/274 |
| 7,726,433 B2 * | 6/2010 | Satou | B60R 21/36 |
| | | | 180/274 |
| 7,770,684 B2 * | 8/2010 | Takimoto | B60R 21/36 |
| | | | 180/274 |
| 7,857,087 B2 * | 12/2010 | Matsuura | B60R 21/02 |
| | | | 180/274 |
| 7,997,614 B2 * | 8/2011 | Ishikawa | B60R 21/2338 |
| | | | 112/285 |
| 8,006,997 B2 * | 8/2011 | Inoue | B60R 21/36 |
| | | | 180/274 |
| 8,104,563 B2 * | 1/2012 | Narita | B60R 21/36 |
| | | | 180/274 |
| 8,235,159 B2 * | 8/2012 | Mildner | B60R 21/36 |
| | | | 180/274 |
| 8,770,334 B2 * | 7/2014 | Rick | B60R 21/38 |
| | | | 180/274 |
| 8,985,257 B2 * | 3/2015 | Tanaka | B60R 21/237 |
| | | | 180/274 |
| 8,985,678 B2 * | 3/2015 | Sugishima | B60R 13/0838 |
| | | | 296/192 |
| 9,387,823 B2 * | 7/2016 | Choi | B60R 21/36 |
| 9,834,172 B2 * | 12/2017 | Hara | B60R 21/36 |
| 2007/0023223 A1 * | 2/2007 | Okamoto | B32B 17/10036 |
| | | | 180/274 |
| 2009/0145681 A1 * | 6/2009 | Hayashi | B60R 21/38 |
| | | | 180/274 |
| 2009/0223360 A1 * | 9/2009 | Aoki | B60R 21/38 |
| | | | 92/15 |
| 2010/0300792 A1 | 12/2010 | Yuan et al. | |
| 2016/0229373 A1 * | 8/2016 | Higashimachi | B60R 21/36 |
| 2016/0311395 A1 * | 10/2016 | Hara | B60R 21/36 |
| 2017/0008484 A1 * | 1/2017 | Takase | B60R 21/36 |

FOREIGN PATENT DOCUMENTS

| | | | |
|---|---|---|---|
| DE | 102007033796 A1 | | 1/2009 |
| DE | 102011101496 A1 | | 11/2012 |
| DE | 102013014206 A1 | | 2/2015 |
| EP | 3012162 A1 * | 4/2016 | ............ B60R 21/36 |
| JP | 2016097833 A * | 5/2016 | |
| WO | 2014139937 A2 | | 9/2014 |

* cited by examiner

MOTOR VEHICLE COMPRISING PEDESTRIAN AIRBAG

CROSS-REFERENCE TO RELATED APPLICATION

This application claims priority to German Patent Application No. 102016004110.2, filed Apr. 5, 2016, which is incorporated herein by reference in its entirety.

TECHNICAL FIELD

The present disclosure pertains to a motor vehicle, and more particularly to a device for partially opening a front hood in the area of the front windscreen and an airbag module configured to deploy in the area for protecting pedestrians.

BACKGROUND

Motor vehicles can have additional airbag modules as pedestrian airbag modules, including a gas generator and an airbag for the protection of pedestrians and for deployment in the area of an exterior of the motor vehicle, in particular on a front windscreen and/or on at least one A-column and/or on a front hood and/or on at least one fender. Such airbag modules serve the purpose of providing impact protection in the area of the front windscreen or windshield, respectively, and/or A-column and/or the front hood as well as in the area of the fenders in response to a collision with pedestrians, bicyclers or other similar road users. The airbag thus deploys in the area of the front windscreen and/or of at least one A-column and/or of the front hood and/or of at least one fender, so that pedestrians, bicyclers or similar road users are thus additionally protected in response to an impact with the motor vehicle.

The front hood is supported in the area of the corners of the front hood in the vicinity of the front windscreen so as to be capable of being pivoted by two hinges for opening the front hood in case of service of maintenance, in order to gain access to the engine compartment. In the event of a forthcoming collision with a pedestrian or a bicycler, this is detected by a corresponding sensor and unlocking the hinges for supporting the front hood occurs, so that the front hood can thus be lifted by a device from a closed initial position into an accident position, which is partially open in the area of the front windscreen, so that the airbag can deploy towards the front windscreen, the A-pillar, the front hood and at least one fender, due to this partial opening of the front hood in the area of the front windscreen. The device for lifting the front hood in the area of the front windscreen may include a pyrotechnic propelling charge or a hydraulic or pneumatic device. In addition, an unlocking of the two hinges is also necessary with a pyrotechnic propelling charge or a hydraulic or pneumatic device. An additional device for lifting the front hood and for unlocking the hinges is thus necessary. The airbag module is arranged inside the motor vehicle at a large vertical distance to the front hood, so that the airbag needs to thus be embodied so as to be large, because the airbag has to cover a large deploying distance until it first reaches the area at the slit-shaped opening.

A safety system for a motor vehicle is known from DE 100 14 832 A1, including a device, which, in an accident situation involving a collision of the vehicle with a pedestrian, moves the front hood of the motor vehicle from its closed initial position to a position, which is lifted at least in the area of the front windscreen. The safety system includes at least one airbag device, which has at least one or a plurality of finable airbag(s), which, for damping support of the lifted hood from below and/or for large volume coverage of at least most of the front windscreen frame when the hood is lifted, can be filled so as to deploy from the direction of the front hood.

SUMMARY

The present disclosure provides a motor vehicle, in the case of which the airbag module including an airbag for the protection of pedestrians has a small distance to lateral hinges in the area of the front windscreen for the front hood. The motor vehicle includes a vehicle body, a drive motor, in particular an electric motor and/or an internal combustion engine, and a water tank delimited by walls. At least one airbag module includes a gas generator and an airbag for the protection of pedestrians. The airbag module is fastened above the wall of the water tank and thus has a small vertical distance to the front hood for deployment in the area of an exterior of the motor vehicle. A device for lifting a front hood from a closed initial position into an accident position, which is partially open in the area of the front windscreen. When the airbag of the airbag module deploys, the airbag thus already reaches the front windscreen after only a very small deploying distance of the airbag, so that the airbag thus advantageously needs to cover a small deploying distance. The airbag can thus additionally also be used as device for lifting the front hood. An additional device for lifting the front hood is thus not necessary in an advantageous manner. The wall of the water tank, above which the airbag module is arranged, is preferably a wall for delimiting the water tank and the wall of the water tank, above which the airbag module is arranged, preferably has a partial area as extension wall and, as extension wall, this partial area does not serve to delimit the water tank. Advantageously, the airbag module is fastened below the front hood.

In a further embodiment, a distance of between 0.5 cm and 10 cm, in particular of between 1 cm and 6 cm, is present between the airbag module and the front hood. An opening of the airbag module housing after the opening of a flap or cap is preferably oriented substantially vertically upwards or horizontally rearwards or is oriented in a direction therebetween.

In an additional embodiment, the airbag module is fastened to the water tank, in particular to the wall for delimiting the water tank, by a holding device. Due to the arrangement of the at least one airbag module above the wall of the water tank and the fastening of the airbag module to the water tank by the holding device, a particularly simple fastening of the at least one airbag module is thus made possible.

Advantageously, the water tank, in particular the wall for delimiting the water tank and/or a wall including openings, in particular a leaf trap grate of fiber-reinforced plastic is embodied on the water tank and/or a reinforcing plate is additionally arranged on the wall of the water tank. Due to the fastening of the airbag module to the wall of the water tank, it is necessary to design the water tank to be structurally more stable for absorbing larger forces. For this purpose, the water tank is embodied accordingly on the wall of the water tank, for example being made of a fiber-reinforced plastic and/or including an additional reinforcement, such as a holding plate.

Preferably, the airbag module is fastened, in particular additionally or exclusively, to a suspension strut top mounting by the holding device. The suspension strut top mounting is either a part of the body or a part of the suspension strut of the motor vehicle, so that larger threes for fastening the airbag module can thus also be absorbed by the suspension strut top mounting. Advantageously, the airbag module is fastened to the body and/or to the suspension strut top mounting by the at least one holding device.

In an alternative, the airbag module is fastened to the front hood, in particular an underside of the front hood, by the holding device. The front hood made of steel is sufficiently stable or stiff, respectively, for fastening the airbag module by the holding device. Preferably, at least one weld nut is fastened to the front hood and the airbag module is fastened to the front hood by the at least one weld nut, in particular in that the holding device is screwed to the at least one weld nut. Advantageously, the holding device is embodied as a pin and/or a strut and/or a web and/or a beam and/or an angle plate.

In a further embodiment, the airbag module includes a housing. The airbag module housing is made of plastic, in particular of fiber-reinforced plastic. The holding device is formed integrally with the airbag module housing. When the airbag module housing is made of fiber-reinforced plastic, the holding device is thus also made of fiber-reinforced plastic, and can absorb the required forces for fastening the at least one airbag module. In addition, the holding device can thus also be produced in a cost-efficient manner when producing the water tank by injection molding.

In a further embodiment, the holding device is a separate component in addition to the airbag module housing. When designing the holding device as a separate component, the holding device is in particular made of metal, for example steel and/or aluminum. The holding device can thus absorb the necessary forces for fastening the at least one airbag module. In response to deployment of the airbag module, large forces which are to be absorbed by the holding device, appear on the at least one airbag module.

In an additional alternative, the holding device is fastened to the water tank and/or to the front hood and/or to the suspension strut top mounting and/or to the airbag module, in particular to the airbag module housing, by a releasable connecting element. The releasable connecting element, in particular the screw connection or bolt connection, thus also provides for a replacement of the at least one airbag module in the case of maintenance.

In a further alternative, the airbag module is fastened above the wall of the water tank at a distance of at least 1 cm, 3 cm or 5 cm to the wall of the water tank, preferably above a wall for delimiting the water tank. The airbag module thus has the distance of at least 1 cm, 3 cm or 5 cm to the wall of the water tank, in particular to the wall including openings for the water tank, in particular a leaf trap grate, of the water tank.

In a further embodiment, a wall for the water tank is embodied from the water tank in the direction of the front hood. This wall does not serve to delimit the water tank and this wall is preferably embodied in front of a wall for delimiting the water tank. Viewed from the water tank in the direction of the front hood, the wall for the water tank is preferably considered to be a fictitious part of the water tank and the airbag module is preferably fastened above this wall.

In an additional embodiment, the wall for the water tank is arranged on the front hood with a seal. A seal is arranged on the wall for the water tank, so that the water tank and also the at least one airbag module is thus separated from the engine compartment. The air for the air conditioning system drawn into the interior of the motor vehicle is drawn in in the water tank and passes through openings in the wall, in particular embodied as leaf trap grate, into the water tank. Due to the seal and the wall for the water tank, this air is thus not drawn in from the engine compartment, but from an opening area between the rear end of the front hood and the front windscreen, so that this wall supports the function of the water tank. Air is thus not drawn into the interior of the motor vehicle from the engine compartment.

In an advantageous embodiment, the motor vehicle includes a sensor for detecting a forthcoming collision with a pedestrian and/or the motor vehicle includes a device configured to unlock a hinge of the front hood in the area of the front windscreen. The motor vehicle includes a device for lifting the front hood in the area of the front windscreen and the device is preferably embodied as a pyrotechnic propelling charge or as an actuator or as a spring or is formed by the airbag. Due to the design of the airbag module with a short distance to the front hood, the deploying airbag can be used as device for lifting the front hood in the area of the front windscreen. No additional device, for example a pyrotechnic propelling charge or a hydraulic or pneumatic actuator or device for lifting the front hood, respectively, is necessary in an advantageous manner in the case of a forthcoming collision with a pedestrian, a bicycler or a similar road user. In the case of an embodiment of the device and of the actuator and/or as pyrotechnic propelling charge and/or as spring, an unlocking takes place first, for example, then a lifting of the front hood and subsequently the activation or deployment, respectively, of the airbag.

In an additional embodiment, the device for unlocking the hinge of the front hood is formed by the airbag. An additional device, for example a pyrotechnic propelling charge or a hydraulic or pneumatic actuator for unlocking the hinge, is thus not necessary. The hinge has a corresponding mechanism, which is actuated and moved by the airbag in response to deployment and/or the hinge has a rivet, which is severed by the deploying airbag.

The airbag module described in this property right application is a pedestrian protection airbag module including a gas generator and an airbag for the protection of pedestrians and for deployment in the area of an exterior of the motor vehicle, in particular an exterior of the front windscreen and/or at least one A-column and/or the front hood and/or at least one fender.

In an additional embodiment, the motor vehicle includes two airbag modules, in each case including a gas generator and an airbag for the protection of pedestrians and for deployment in the area of an exterior of the motor vehicle.

In an additional embodiment, the at airbag module is embodied with the gas generator and the airbag for the protection of pedestrians and for deployment in the area of an exterior of the motor vehicle in the area of a hinge for the front hood and/or in the area of a suspension strut top mounting, the one airbag module has a distance of less than 30 cm, 20 cm, 10 cm or 5 cm to the hinge for the front hood and/or the suspension strut top mounting.

Advantageously, the gutter serves the purpose of drawing in air for an air conditioning system and for discharging water, in particular splash water. For example, the water is discharged downwards to the ground by a line, for example, at the end areas of the water tank. The airbag module has a sufficient distance to the water tank, so that air can be drawn into the water tank.

In a further embodiment, the airbag module is fastened such that, in a vertical section in longitudinal direction of the motor vehicle, a center of gravity of the airbag module is positioned above the wall of the water tank. In a further alternative, the water tank connecting wall is not a wall for delimiting the water tank.

In an additional embodiment, the motor vehicle includes at least one seat with a seat part and a back part.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
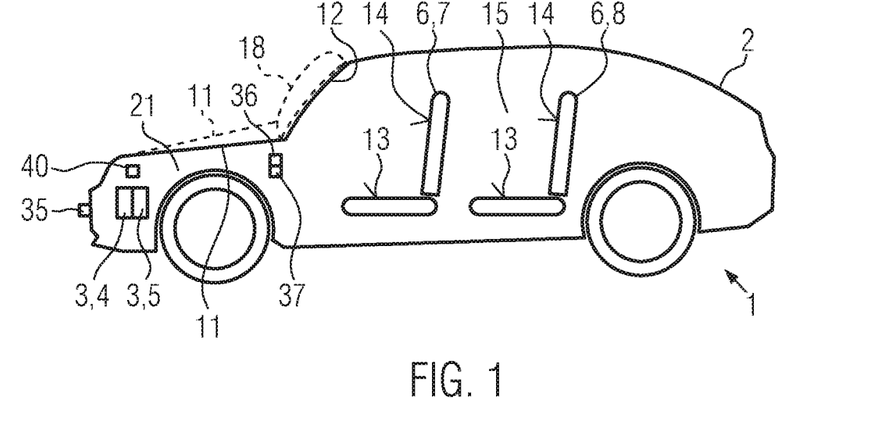
FIG. 1 shows a side view of a motor vehicle.

A motor vehicle 1 illustrated in FIG. 1 has a body 2 made of metal, in particular steel. The motor vehicle 1 is moved by a drive motor 3, for example an electric motor 4 and/or an internal combustion engine 5. The body 2 delimits an interior 15, and two front seats 7 are arranged as seats 6 as well as three back seats 8 are arranged as seats 6 inside the interior 15. The three back seats 8 are thereby combined to form a seat bench. The front seat 7 includes a seat part 9 and a back part 10. The seat part 9 of the front seat 7 has a seat surface 13 for a person to sit on and the back part 10 of the front seat 7 as seat 6 has a back surface 14 for placing a back of a person on the seat 6.

Figure 4:
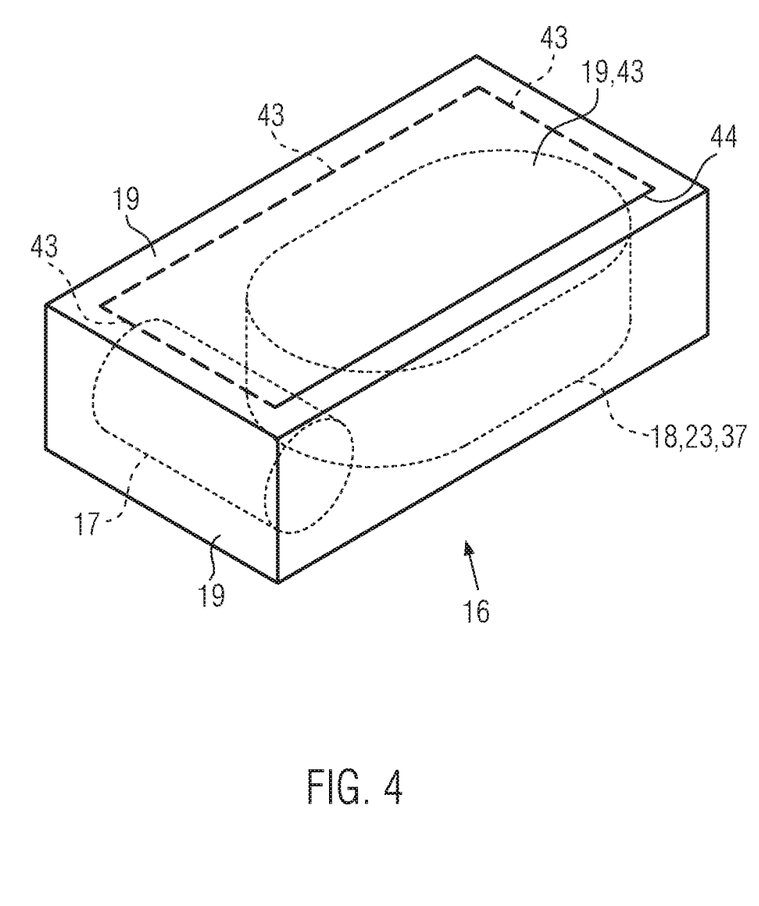
FIG. 4 shows a perspective view of an airbag module.

The motor vehicle 1 includes two airbag modules 16 (FIG. 4), in each case including a gas generator 17 and an airbag 18 for the protection of pedestrians, bicyclers or similar road users and for the deployment in the area of an exterior of a front windscreen 12, the A-column as well as on a partial area of a front hood 11 and for the deployment in the area of an exterior of the two fenders. The airbag 18 also deploys partially underneath the front hood 11 due to the arrangement of the airbag module 16 underneath the front hood 11. The airbag module 16 has an airbag module housing 19 made of plastic and/or metal and the airbag 18 and the gas generator 17 is arranged inside the airbag module housing 19. The airbag module housing 19 has a flap 44 or a cap 44, which can be pivoted by an integral hinge 44 for opening the airbag module housing 19, so that, in the case of an open cap 44, an opening, from which the airbag 18 can emerge in response to deployment, is present on the airbag module housing 19. A sensor 35 for detecting a forthcoming collision with a pedestrian, a bicycler or a similar road user, is embodied in the area of a front bumper of the motor vehicle 1. The data acquired by the sensor 35 are evaluated by a control and/or regulating unit and the two airbag modules 16 are activated by a controller and/or regulating unit in the event of a forthcoming collision. A front hood 11 is supported so as to be capable of being pivoted about a pivot axis by two hinges 36. The pivot axis for pivoting the front hood 11 is thereby oriented horizontally and in transverse direction of the motor vehicle 1. In the case of service or maintenance for the drive motor 3, the front hood 11 can thus be pivoted about the pivot axis, so that the drive motor 3 can thus be accessed. The hinges 36 are in each case arranged on or fastened to, respectively, the rear corner areas of the front hood 11 in the vicinity of the front windscreen 12, so that a front end of the front hood 11 thus moves upwards in response to pivoting and opening of the front hood 11 in the case of service or maintenance for the drive motor 3. The pivot axis of the front hood 11 is thus present in the area or in the vicinity of a rear end of the front hood 11 or of a lower end of the front windscreen 12. Prior to opening the front hood 11 in the case of service or maintenance, a catch element 40 on the front end area of the front hood 11 must be unlocked.

The two airbag modules 16 have a center of gravity 20 and are fastened to the water tank 24 above walls 42 of a water tank 24 by two holding devices 21, such as a web or a strut 22. The water tank 24 serves the purpose of drawing in air from the environment for a non-illustrated air conditioning system of the motor vehicle 1 and the air drawn in by the air conditioning system from the environment is introduced into the interior 15. The water tank 24 or the walls 42, respectively, of the water tank 24 are made of fiber-reinforced plastic and/or of metal, in particular steel. An upper cover wall 42 of the water tank 24 is embodies as a wall 26 including openings 39, that is, for example as a leaf trap grate 26. A water tank connecting wall 27 is present between the water tank 24 and the front windscreen 12 and a further additional leaf trap grate 38 is embodied between the rear end of the front hood 11 and the water tank connecting wall 27. The walls 42 for delimiting the water tank 24 are a bottom wall 42, two side walls 42 and the upper cover wall 42.

Figure 2:
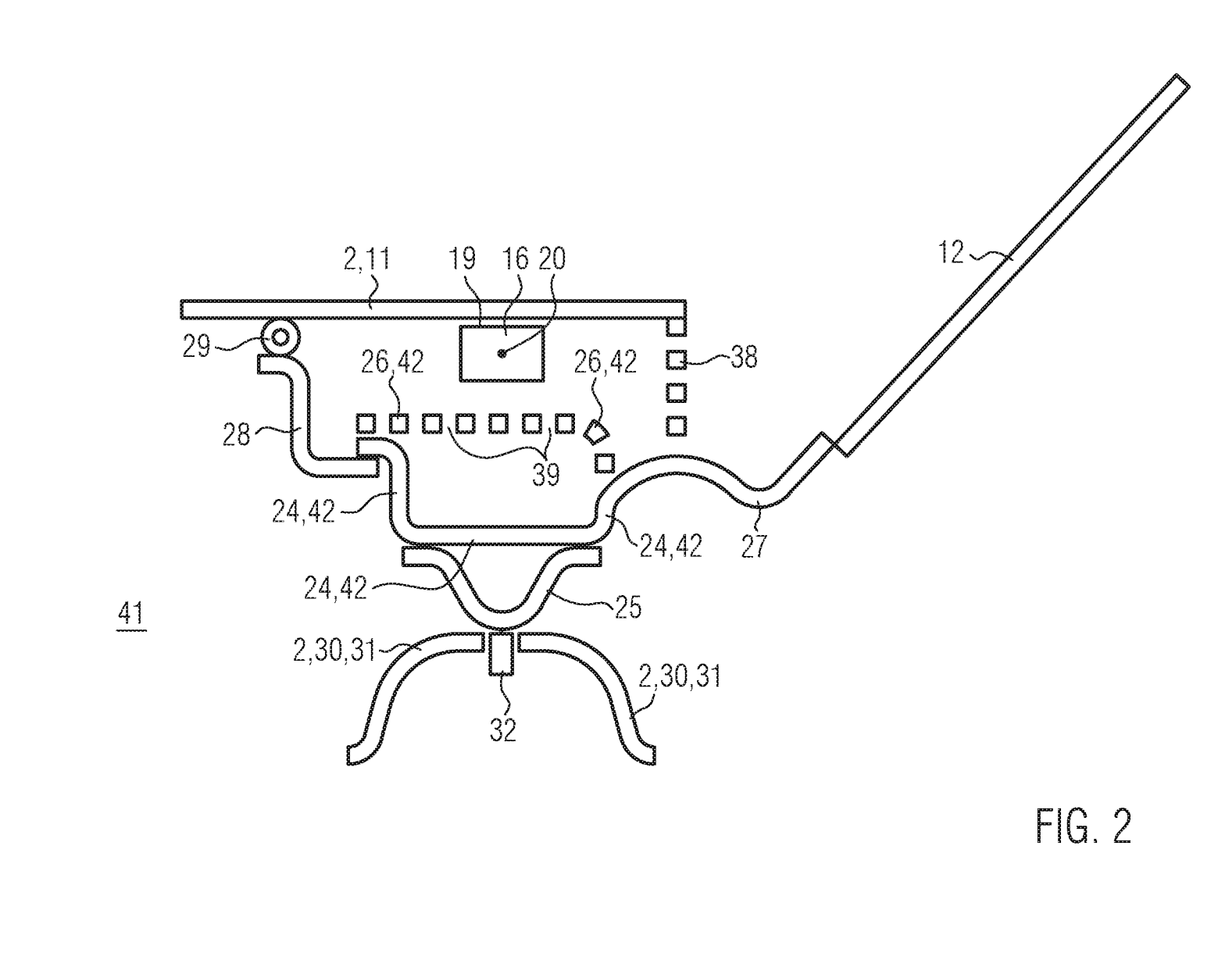
FIG. 2 shows a longitudinal section of the motor vehicle in the area of a water tank in a first exemplary embodiment.
Figure 3:
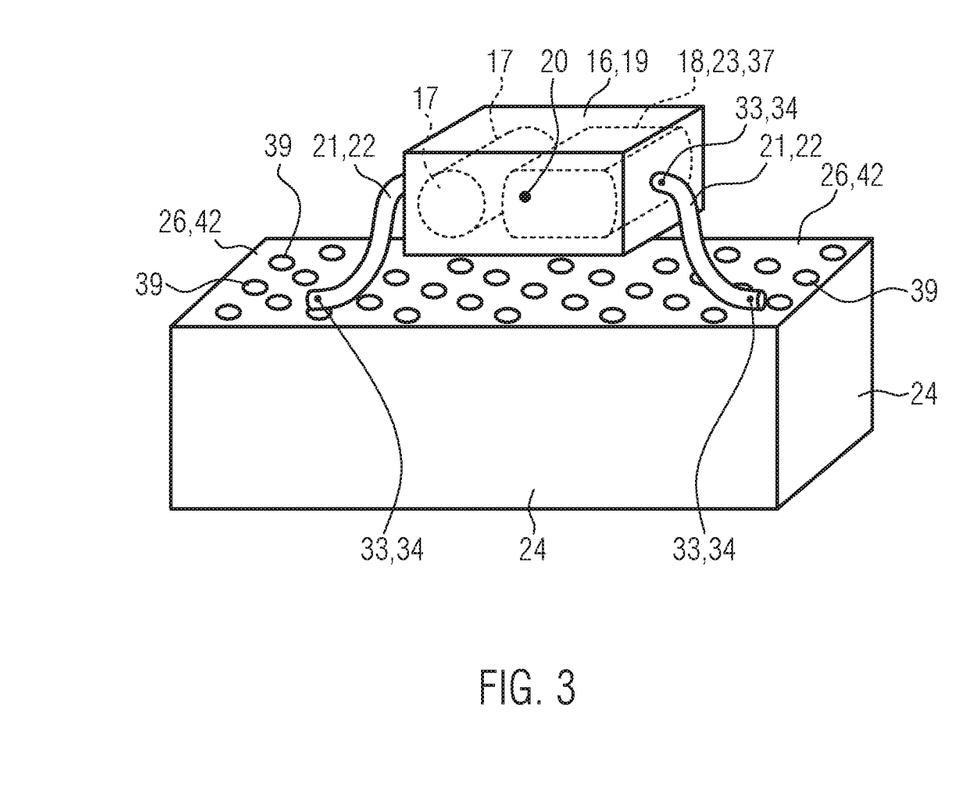
FIG. 3 shows a perspective view of the water tank and of an airbag module arranged above the water tank according to FIG. 2.

The wall 26 is made of fiber-reinforced plastic and/or metal, in particular steel, and on the wall 26, the airbag module 16 is fastened above the water tank 24 and also above the wall 26 including the openings 39 for drawing in air by the holding devices 21. At the respective end areas, the holding devices 21 are fastened to the airbag module 16 and to the wall 26 of the water tank 24 by a releasable connecting element 33, such as a screw connection 34. Due to the design of the water tank 24, in particular of the wall 26 including the openings 39 of the water tank 24, of the fiber-reinforced plastic and/or metal, the water tank 24 can accordingly absorb the forces, which the holding devices 21 introduce into the water tank 24 in response to the triggering of the airbag module 16. The water tank 24 is fastened to a suspension strut top mounting 30 by a fastening device 25, such as a substantially U-shaped sheet. The suspension strut top mounting 30 includes a first suspension strut top mounting component 31 as a part of the body 2 and a second suspension strut top mounting component 32 as a part of a non-illustrated suspension strut. Deviating from this, the water tank 24 can also be directly fastened to the second suspension strut top mounting component 32, for example by sheet metal adapters. In the case of a fastening to the suspension strut top mounting 30, the fastening device 25 is thus fastened to the first suspension strut top mounting component 31 as part of the body 2 and/or to the second suspension strut top mounting component 32 as part of the suspension strut. A further wall 28 for the water tank 24 is fastened to the front end area of the water tank 24, and a seal 29 is arranged on an upper end area of this wall 28 (FIG. 2). The wall 28 may presumably be considered to be part of the water tank 24. Due to this seal 29, the space between the front hood 11, the wall 28 as well as the water tank 24 and the water tank connecting wall 27 as well as the additional leaf trap grate 38 is thus sealed with respect to the engine compartment 41 including the drive motor 3. The air drawn in by the air conditioning system in the water tank 24, which is drawn in through the openings 39 of the wall 26, is thus not drawn in from the engine compartment 41, but only directly from the environment through the additional leaf trap grate 38.

The airbag module 16 has a distance of 3 cm to the front hood 11 and a distance of approximately 1 cm to the water tank 24, i.e. to the wall 26 including the openings 39 of the water tank 24. A forthcoming collision of the motor vehicle 1 with a pedestrian or a bicycler is detected by the sensor 35. The two airbag modules 16 are fastened in the area or in the vicinity, respectively, of the two hinges 36, in particular have a distance of less than 30 cm, 20 cm, 10 cm or 5 cm to the hinge 36 and/or the suspension strut top mounting 30. In response to the activation of the two airbag modules 16, the airbag 18 acts as a device 37 for unlocking the hinge 36 in the initial phase of deployment of the airbag 18. The hinge 36 has a corresponding actuating element, for example a lever, so that a movement of the actuating element due to a pressure contact of the airbag 18 with the non-illustrated actuating element is carried out as a result of the deploying airbag 18, and an unlocking of the two hinges 36 is thus carried out. In the case of an unlocked hinge 36, the front hood 11 on the rear corner area of the front hood 11 can thus be lifted from a closed initial position (illustrated with continuous line) into a partially open accident position (illustrated with dashed line) in the event of a collision or the forthcoming collision, respectively, with a pedestrian in a vertical direction, so that a sit-shaped opening is present between the rear end area of the front hood 11 and the remaining motor vehicle 1 according to the dashed illustration of the front hood 11 in FIG. 1. In the case of this partial opening of the front hood 11 as a result of an accident, the catch element 40 on the front end area of the front hood 11 thus serves as an additional hinge for pivoting the front hood 11 about a pivot axis in transverse direction of the motor vehicle and horizontally through the catch element 40. The lifting of the front hood 11 on the rear end area is carried out by a device 23 and the device 23 is also formed by the two airbags 18 of the two airbag modules 16. Due to the fact that the two airbag modules 16 are embodied in the rear end areas underneath the front hood 11, the two airbags 18 can thus unlock the two hinges 36 on the one hand and can additionally lift the front hood 11 upwards in vertical direction from the closed initial position into the partially open accident position at the two corner areas of the front hood 11. In this partially open accident position, the front hood 11 is locked by a non-illustrated mechanism, so that the two airbags 18 can subsequently deploy accordingly through the slit-shaped opening between the rear end of the front hood 11 and the remaining motor vehicle 1 so as to protect pedestrians, bicyclers or similar road users. After the complete deployment of the two airbags 18, the two airbags 18 at least partially cover the front windscreen 12 and/or the A-columns of the body 2 in the area of the front windscreen 12 and/or the front hood 11 and/or the fenders of the body 2.

In a further, non-illustrated exemplary embodiment, the two airbag modules 16 are fastened to the front hood 11 by the holding devices 21. In a further, non-illustrated exemplary embodiment, the two airbag modules 16 are fastened to the suspension strut top mounting 30 by the holding devices 21. The individual exemplary embodiments of the motor vehicle 1 can preferably be combined with one another.

Viewed as a whole, the motor vehicle 1 according to the present disclosure is associated with significant advantages. The two airbag modules 16 have a short distance to the front hood 11 and are furthermore arranged in the area or in the vicinity, respectively, of the two hinges 36. The deploying airbags 18 can thus unlock the hinges 36 and can additionally also act as device 23 for lifting the front hood 11. Additional components in addition to the airbag 18 for the device 23 for lifting the front hood 11 and an additional device 37 for unlocking the hinge 36 are thus not necessary. Due to the short vertical distance of the airbag module 16 to the front hood 11, the airbag 18 thus also has a short distance to the front hood 11, and, due to the short horizontal distance of the airbag module 16 of less than 30 cm, 20 cm, 10 cm or 5 cm to the respective assigned one hinge 36, the hinge 36 can thus be unlocked easily during the initial phase of deployment of the airbag 18. Of the two airbag modules 16, one airbag module 16 is thus in each case assigned to one hinge 36 for unlocking the hinge 36.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle comprising:
   a vehicle body having a water tank delimited by a wall and a front hood and a front windscreen;
   an airbag module fastened above the wall of the water tank and including a gas generator and an airbag configured to deploy in an area of an exterior of the motor vehicle for the protection of pedestrians;
   a suspension strut top mounting;
   a holding device fastening the airbag module to the suspension strut top mounting via the water tank; and
   a device for lifting the front hood from a closed initial position into an accident position, which is partially open in an area of the front windscreen.

2. The motor vehicle according to claim 1, wherein the airbag module is fastened underneath the front hood.

3. The motor vehicle according to claim 2, wherein airbag module is fastened underneath the front hood a distance in a range between 0.5 cm and 10 cm.

4. The motor vehicle according to claim 3, wherein the range is between 1 cm and 6 cm.

5. The motor vehicle according to claim 1, wherein the airbag module is further fastened to the front hood by the holding device.

6. The motor vehicle according to claim 5, wherein the holding device comprises a web.

7. The motor vehicle according to claim 1, wherein the holding device comprises a web.

8. The motor vehicle according to claim 1, wherein the airbag module further comprises an airbag module housing.

9. The motor vehicle according to claim 8, wherein the holding device is formed integrally with the airbag module housing.

10. The motor vehicle according to claim 8, wherein the holding device is formed separate from the airbag module housing.

11. The motor vehicle according to claim 8 wherein at least one of the water tank, the front hood, or the airbag module housing includes a releasable connecting element.

12. The motor vehicle according to claim 1, wherein the wall for the water tank extends from the water tank in the direction of the front hood.

13. The motor vehicle according to claim 12, wherein the wall for the water tank is arranged on the front hood with a seal.

14. The motor vehicle according to claim 1, wherein the device for lifting the front hood in the area of the front windscreen comprises the airbag.

15. A motor vehicle comprising:
- a vehicle body having a water tank delimited by a wall, a front hood and a front windscreen;
- a suspension strut top mounting;
- an airbag module including a gas generator and an airbag configured to deploy in an area of an exterior of the motor vehicle for the protection of pedestrians;
- a holding device fastening the airbag module to the suspension strut top mounting via the water tank; and
- a device for lifting the front hood from a closed initial position into an accident position, which is partially open in an area of the front windscreen,
- wherein the airbag module is fastened to the water tank at a distance of at least 1 cm above the wall of the water tank.

* * * * *